April 28, 1925.

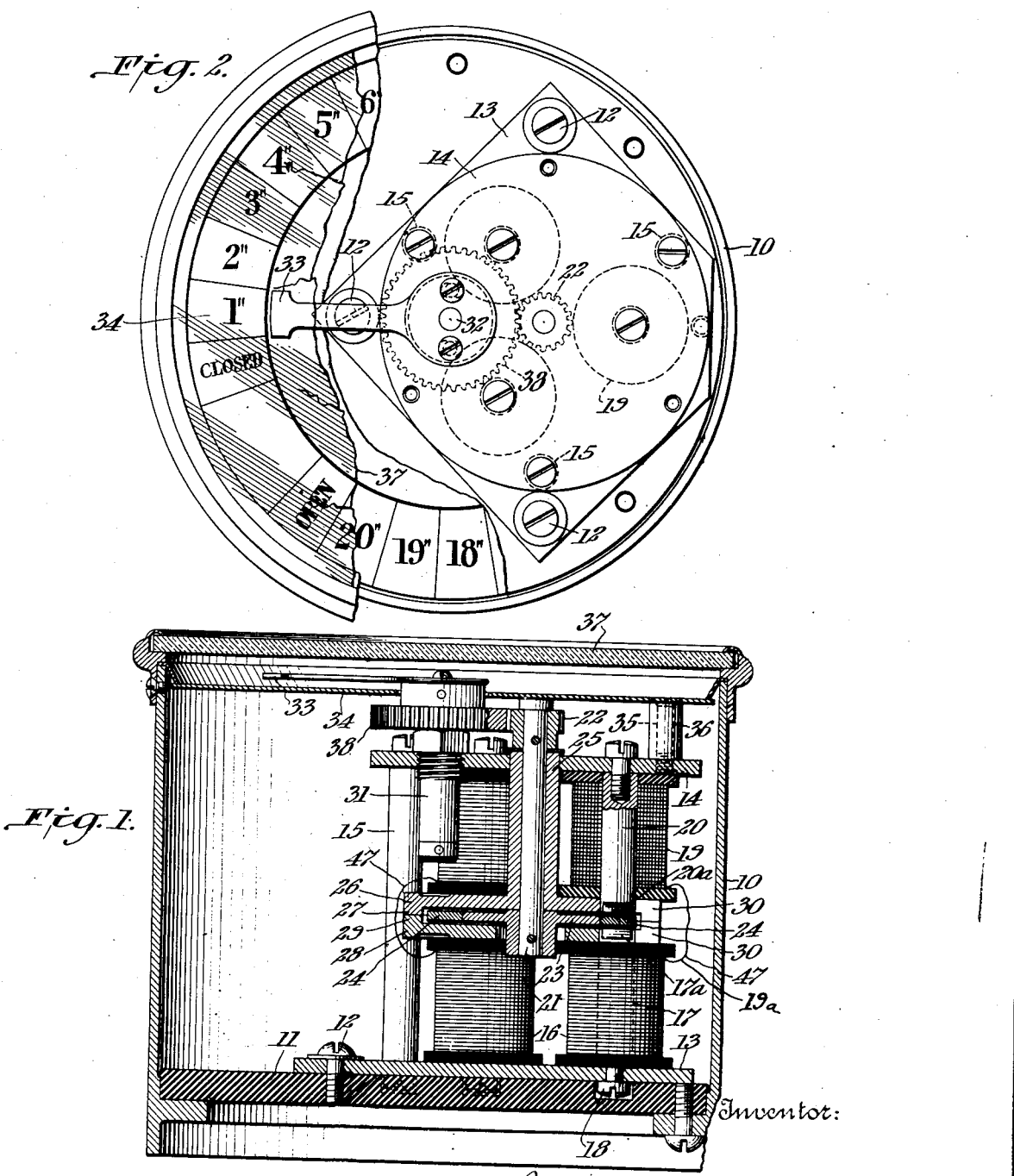

P. VAN SANTEN KOLFF 1,536,021

STEP BY STEP MOTOR

Filed March 11, 1922

Inventor:
Petrus van Santen Kolff
by Byrnes Townsend & Brickenstein
Attorneys.

Patented Apr. 28, 1925.

1,536,021

UNITED STATES PATENT OFFICE.

PETRUS VAN SANTEN KOLFF, OF PHILADELPHIA, PENNSYLVANIA, ASSIGNOR TO THE ELECTRIC TACHOMETER CORPORATION, A CORPORATION OF DELAWARE.

STEP-BY-STEP MOTOR.

Application filed March 11, 1922. Serial No. 543,058.

*To all whom it may concern:*

Be it known that I, PETRUS VAN SANTEN KOLFF, a citizen of the United States, residing at Philadelphia, in the county of Philadelphia and State of Pennsylvania, have invented certain new and useful Improvements in Step-by-Step Motors, of which the following is a specification.

My invention relates to that class of apparatus for electrically transmitting signals or conveying intelligence from one point to another a distance away in which a step by step motor is employed as a receiver.

The present invention has as its object a step by step motor simple in construction and operation and accurate and reliable in its function.

In order to fully explain the principle of operation and the advantages of the invention reference is made to the accompanying drawings in which—

Fig. 1 is a vertical section through an apparatus embodying the invention;

Fig. 2 is a plan view thereof;

Figure 3:
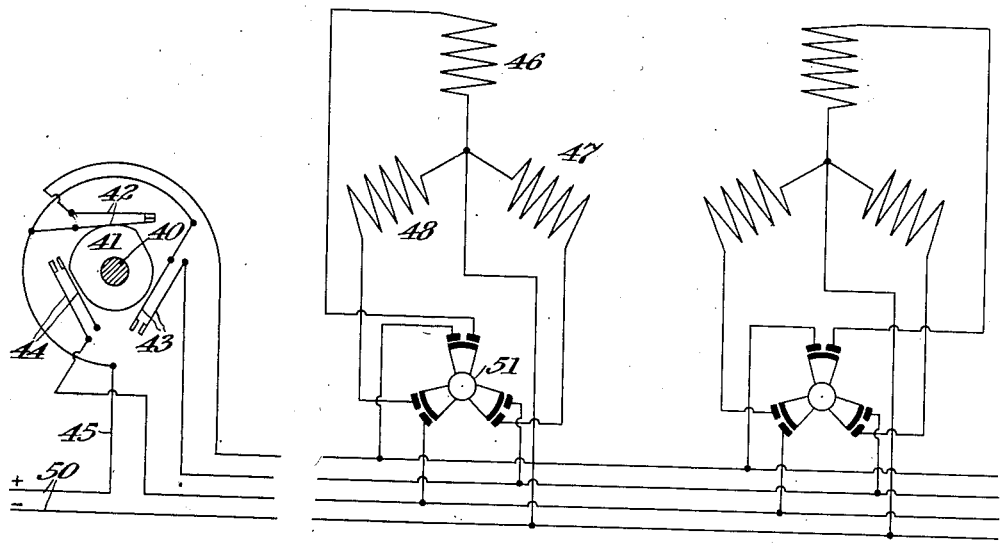
Fig. 3 is a wiring diagram indicating in a general way the electrical connections for operating one or a plurality of motors.
Figure 4:
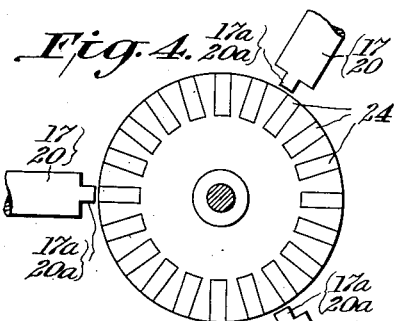
Fig. 4 is a diagrammatic representation of the principal parts of the invention and Figs. 5 and 6 are a fragmentary plan view and section, respectively, of a modified form of construction embodying the invention.

Having reference to Figs. 1 and 2, 10 is a casing containing a base plate 11 of insulating material. Upon the base plate 11 is secured by means of screws 12 a frame comprising a bottom plate 13 of soft steel, a top plate 14 of soft steel and spacing columns 15 of soft iron, preferably brass-plated.

Upon the plate 13 are mounted three solenoids 16 spaced 120° apart and containing each an iron core 17. The solenoids are secured to the plate 13 by means of screws 18 or in any other suitable manner.

Three similar solenoids 19 containing cores 20 are secured to the top plate 14 in alignment with the lower set of solenoids. As indicated in Fig. 1, the solenoids 16 and the solenoids 19 are interconnected in pairs by connections 19ᵃ and each pair of solenoids forms part of an individual electric circuit for separately energizing the solenoids, as will be more fully pointed out.

Through the top plate 14 centrally between the solenoids extends a shaft 21 carrying at its upper end a pinion 22 and at its lower end a brass disk 23 having a relatively large number of closely spaced radial inserts 24, preferably of soft iron in closely spaced relation adjacent its peripheral edge. The shaft 21 is surrounded by a sleeve 25 of brass or other nonmagnetic material which carries at its lower end a disk 26 of like material. The disk 26 has a flange 27 extending downwardly around the edge of the disk 23 and a brass disk 28 having an upwardly extending flange 29 is connected to it to form therewith a case for the disk 23. Both the disk 26 and the disk 28 have angularly spaced radial slots 30 in alignment with the cores 17 and 20.

The cores project beyond the ends of the solenoids and the projecting ends are cut away to leave tongues 17ᵃ and 20ᵃ respectively fitting the slots 30 and constituting a pair of poles. The outer faces of the tongues are substantially flush with the inner surface of the disks 26 and 28 respectively.

Upon the top plate 14 is mounted in a bronze bearing 31 a shaft 32 carrying at its upper end a pointer 33 co-operating with a dial 34 which is supported upon the plate 14 by means of screws 35 and spacers 36 through a gear 38.

The casing 10 is closed on the top by a glass cover 37.

The foregoing furnishes an example to merely indicate in a general way the structural relationship of the principal parts of the invention and of certain auxiliary details which may be included to make a commercial construction.

There is, of course, considerable latitude in carrying out the object of the invention. In the foregoing reference has been made to three solenoids spaced 120° apart. So far as the principle of operation is concerned any number of solenoids greater than 2 may be employed and the angular spacing need not be uniform. The number of inserts 24 in disk 23 may also vary within wide limits, provided that the number is sufficiently large and the angular spacing sufficiently small to bring about small angular movements of the disk 23.

The arrangement must generally be such that one insert is always out of alignment with a pair of poles but near enough to be attracted by them when they are energized to define poles of opposite polarity. When the individual magnetic circuits are energized in proper order, one of the inserts is drawn into the gap between the poles imparting angular movement to the disk 23. When an insert reaches its final position in alignment with the cores, the motion ceases and another insert has reached a position close to another pair of solenoids.

It is thus clear that by establishing a definite order in successively energizing the different pairs of solenoids a progressive step by step movement is imparted to the disk 23 in one direction. By reversing the order, the direction of rotation is reversed. It is thus a simple matter of control to determine the direction of rotation and also to determine the angular position of the disk 23.

The facility of control and accuracy of response may be utilized in many ways and for various purposes.

In Fig. 3 is indicated a mode of operation for using the arrangement as a revolution counter. In Fig. 3, 40 represents a shaft which may be connected by suitable gearing to a shaft the revolutions of which are to be counted. The shaft 40 carries an eccentric 41 which during one revolution of shaft 40 successively closes three switches 42, 43 and 44. One element of each switch is connected to a common connection 45 connected with one pole of an electric supply circuit 50. The other elements of the switches are connected to one end of the solenoids 46, 47 and 48 respectively, the other ends of the solenoids being connected with the other pole of the circuit 50. A three point switch 51 may be placed intermediate the switches 42, 43 and 44 and the solenoids for making the motor inoperative.

The solenoids 46, 47 and 48 represent pairs of solenoids 16, 19 previously referred to.

For the sake of simplicity the electrical connections have not been indicated in Fig. 1 except the series connections 19ª between pairs of solenoids 16, 19. In practice I prefer to bring the free ends of the top solenoids to a common post and the free ends of the bottom solenoids to individual posts and provide suitable terminals for the posts for establishing in the usual way the connections previously referred to.

As indicated in Fig. 3 a plurality of motors may be operated at the same time to provide a plurality of revolution counters at different points of observation. It is needless to point out all the various modifications which may be made in the mechanical part of the counter for translating the motion of the disk 23 or the shaft 21.

While specific reference has been made to the use of the invention as part of a revolution counter, it is obvious that the invention may be advantageously applied in all instances where it is desired to visually indicate the direction and extent of movement of an element located at a place which is uninviting, inaccessible, difficult to reach or remote from a desired point of observation. It is merely necessary to provide mechanism for translating the motion of such element, whether it be linear motion or angular motion, into motion of a switch mechanism of the order represented by the shaft 40, eccentric 41 and switches 42, 43 and 44. The class of switch mechanisms available for such purpose has wide limits as is easily understood.

As concrete cases in the general field of application may be mentioned valve or gate control in power plants, locks, sluices, dams or the like or damper-control in large flues or smokestacks etc.

The peculiar advantage of the form of motor described is due to the accuracy of angular movement in response to a primary movement, linear or angular. By increasing the number of inserts or the number of solenoids or both and selecting an appropriate form of control switch or suitably modifying a particular form of control switch, it is possible to obtain an indicator which is absolutely true for all practical purposes.

In the form of device shown in Figs. 1 and 2, the different detail parts referred to, such as the housing of non-magnetic material including the disks 26 and 28 and the sleeve 25 etc. have special utility, but are by no means indispensable. In fact the invention may be carried out by radically different arrangements. It is indeed not absolutely essential that the solenoids be in vertical alignment and it is even not necessary that two separate aligned solenoids be employed. It is merely necessary that a plurality of angularly spaced magnetic circuits are progressively established which act in cyclic order upon different inserts as armatures and draw them into the magnetic path thereby effecting rotation of the rotary element. Thus the magnetic circuits could be disposed to define a circular series of radial gaps for a hollow cylinder carrying the inserts. The rotary member can in fact be a disk or it may contain a cylindrical portion or a conical portion passing through gaps which are then suitably modified for such constructions.

Figure 5:
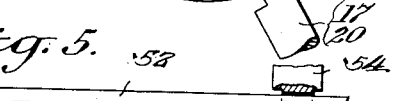
Figure 6:
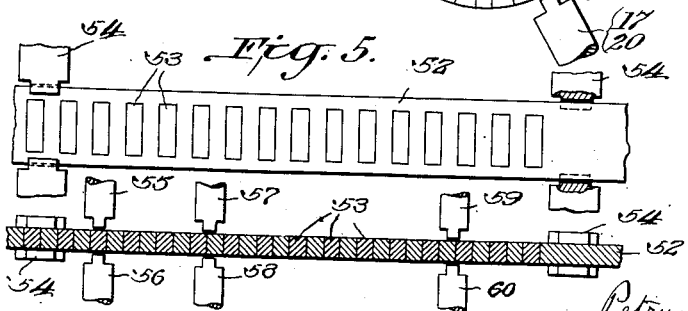

In the foregoing the invention has been defined in connection with rotary elements carrying the inserts and indeed the form of device described constitutes a preferred embodiment. However, within the broader aspect of the invention, the element carrying the magnetic inserts may follow different laws of motion. To show one concrete example, reference is had to Figs. 5 and 6 in which the element carrying the inserts 53 is a plate 52 supported for linear motion in guides 54. Three magnetic circuits represented by pairs of poles 55 and 56, 57 and 58, and 59 and 60 respectively, may be used, although as has been previously pointed out, four or more magnetic circuits may be used, provided that the distribution of the magnetic circuits is such that one insert is always out of alignment with a pair of poles but near enough to be attracted thereby. While a movable element has necessarily only a limited range of motion and is to that extent not of such general application as a rotary element, it is equally useful in all cases where a movable body the position of which is to be indicated has only a limited movement. Thus the linear motion element shown in Figs. 5 and 6 may find ready application for instance in connection with gates or dampers.

The principal characteristic of all forms embodying the invention is the relation of the magnetic circuits and the segments. The magnetic lines of force pass through the movable element containing the inserts at right angle to the plane of motion and not in the plane of motion thereof as is the case in other types. The insert acted upon by one of the magnetic circuits is always close to that circuit so that the magnetic coupling is strong and produces a powerful torque with little variation between the starting torque and the final torque.

Another advantage is the unlimited number of steps obtainable by simply increasing the number of inserts or by properly coordinating the inserts and the number of magnetic circuits. In fact by appropriate design the motor, although essentially of the step by step type may outwardly appear as having a continuous motion, since the steps or increments of motion may be made very small.

I claim:

1. A step by step motor comprising a movable member of non-magnetic material containing magnetic elements of small extent in the direction of motion and magnetically separated from each other, a plurality of separate magnetic circuits each disposed to successively include the said magnetic elements and means for separately energizing the magnetic circuits, the number of magnetic elements being large relatively to the number of magnetic circuits and the relative position of the magnetic elements and circuits being such that when one magnetic element is included in one magnetic circuit, another magnetic element is less than the distance between adjacent elements away from another magnetic circuit.

2. A step by step motor, comprising a rotary disk of non-magnetic material containing along its peripheral portion magnetic elements of small angular extent magnetically separated from each other, a plurality of magnetic circuits spaced along the said peripheral portion on opposite sides thereof so as to successively and alternately include one of the elements as a part during rotary movement and means for separately energizing the individual magnetic circuits in cyclic order, the number of magnetic elements being large relatively to the number of magnetic circuits and the relative position of the magnetic elements and the circuits being such that when one magnetic element is included in one magnetic circuit another magnetic element is less than the distance between adjacent elements away from another circuit.

3. A step by step motor comprising a movable member of non-magnetic material containing magnetic elements of small extent in the direction of motion and magnetically separated from each other, a plurality of separate magnetic circuits each disposed to successively include the said magnetic elements, each magnetic circuit including pole pieces on opposite sides of the movable member of substantially the same extent in the direction of motion as the magnetic elements and means for separately energizing the magnetic circuits, the number of magnetic elements being large relatively to the number of magnetic circuits and the relative disposition of the magnetic elements and magnetic circuits being such that when one magnetic element is included in one magnetic circuit another element is less than the distance between two adjacent elements away from another magnetic circuit.

4. A step by step motor, comprising a rotary disk of non-magnetic material containing along its peripheral portion magnetic elements of small angular extent magnetically separated from each other, a plurality of magnetic circuits spaced along the said peripheral portion on opposite sides thereof and including each pole pieces of substantially the same angular extent as the magnetic elements, and means for separately energizing the individual magnetic circuits in cyclic order, the number of magnetic elements being large relatively to the number of magnetic circuits and the relative position of the magnetic elements and magnetic circuits being such that when one magnetic element is in alignment with one pair of pole pieces another magnetic element is less than the distance between the adjacent elements away from another pair of pole pieces.

In testimony whereof, I affix my signature.

PETRUS van SANTEN KOLFF.